(12) United States Patent
Mestha et al.

(10) Patent No.: US 8,441,691 B2
(45) Date of Patent: May 14, 2013

(54) REDUCING THE SIZE OF A HIGH RESOLUTION PROFILE LOOKUP TABLE

(75) Inventors: Lalit Keshav Mestha, Fairport, NY (US); Prudhvi Krishna Gurram, Silver Spring, MD (US)

(73) Assignee: Xerox Corporation, Norwalk, CT (US)

( * ) Notice: Subject to any disclaimer, the term of this patent is extended or adjusted under 35 U.S.C. 154(b) by 560 days.

(21) Appl. No.: 12/793,864

(22) Filed: Jun. 4, 2010

(65) Prior Publication Data

US 2011/0299128 A1    Dec. 8, 2011

(51) Int. Cl.
| | |
|---|---|
| G06K 15/00 | (2006.01) |
| G06T 5/00 | (2006.01) |
| H04N 1/407 | (2006.01) |
| H04N 1/409 | (2006.01) |
| G06F 15/00 | (2006.01) |
| G06K 1/00 | (2006.01) |
| G06K 15/02 | (2006.01) |

(52) U.S. Cl.
USPC .......................................... 358/3.26; 358/1.2

(58) Field of Classification Search .......................... None
See application file for complete search history.

(56) References Cited

U.S. PATENT DOCUMENTS

| | | |
|---|---|---|
| 6,360,007 B1 | 3/2002 | Robinson et al. |
| 6,636,628 B1 | 10/2003 | Wang et al. |
| 7,652,806 B2 | 1/2010 | Schweid et al. |
| 2008/0252931 A1 | 10/2008 | Mestha et al. |
| 2008/0253649 A1 | 10/2008 | Wang et al. |
| 2009/0161183 A1 | 6/2009 | Schweid et al. |
| 2009/0185058 A1* | 7/2009 | Vakrat et al. .................. 348/241 |
| 2011/0222080 A1* | 9/2011 | Monga et al. .................. 358/1.9 |

OTHER PUBLICATIONS

International Color Consortium. Image Technology Colour Management-Architecture, Profile Format, and Data Structure. International Color Consortium, 2004.

Sohail Dianat and LK Mestha and Athimoottil Mathew. Dynamic Optimization Algorithm For Generating Inverse Printer Map With Reduced Measurements, Preceeding of IEEE International Conference On Acoustics, Speech, And Signal Processing. May 14-19, 2006. Toulouse, France.

Daniel E Viassolo and Soheil A Dianat and Lalit K Mestha and Yao R Wang. Practical Algorithm For The Inversion Of An Experimental Input-Output Color Map For Color Correction. Optical Engineerging. vol. 42 No. 3 Mar. 2003.

* cited by examiner

*Primary Examiner* — Douglas Tran
(74) *Attorney, Agent, or Firm* — Philip E. Blair; Fleit Gibbons Gutman Bongini & Bianco P.L.

(57) ABSTRACT

What is disclosed is a system and method for generating a destination profile LUT. In a manner more fully described herein, a high resolution LUT (e.g., 100-cube LUT) is received. Regions of high curvature of the gamut of an image output device are identified. A non-parametric dynamic optimization node selection method is utilized to select a subset of nodes from the high resolution profile LUT which captures these nonlinearities. Down-sampling the high resolution LUT produces a low resolution LUT. The low resolution LUT is up-sampled to a size of the high resolution LUT to obtain a reconstructed LUT. An error is then calculated between the reconstructed LUT and high resolution LUT. The process of node selection is iteratively repeated until all the subsets of nodes are considered. A destination profile LUT is then generated from the subset of nodes with the least error.

17 Claims, 11 Drawing Sheets

| # OF NODES | # OF COLORS | % > 2.1 dE(76) | % > 1 dE2000 | ROUND TRIP ERRORS ||||| 
|---|---|---|---|---|---|---|---|---|
| | | | | AVG dE(76) | MAX dE(76) | AVG dE2000 | MAX dE2000 |
| 100^3 (genRGB) | 1000000 | 0.497 | 0.158 | 0.3735 | 3.517 | 0.1747 | 1.464 |
| 33^3 US (genRGB) | 35937 | 9.1627 | 7.7635 | 0.9609 | 10.0126 | 0.4295 | 3.785 |
| 33^3 ONP (genRGB) | 35937 | 6.41 | 4.717 | 0.8791 | 19.801 | 0.3814 | 3.873 |
| 33^3 DO (genRGB) | 35937 | 6.816 | 3.769 | 0.8385 | 9.52 | 0.364 | 1.988 |
| 100^3 (OptRGB) | 1000000 | 0.3385 | 0.135 | 0.3289 | 5.495 | 0.1579 | 1.455 |
| 33^3 US (OptRGB) | 35937 | 4.5814 | 4.81 | 0.7522 | 6.868 | 0.3415 | 2.712 |
| 33^3 ONP (OptRGB) | 35937 | 3.498 | 2.618 | 0.6943 | 10.619 | 0.3103 | 2.159 |
| 33^3 DO (OptRGB) | 35937 | 5.123 | 2.324 | 0.7216 | 7.45 | 0.3198 | 2.869 |

FIG. 5

| # OF NODES | # OF COLORS | ROUND TRIP ERRORS ||||||
|---|---|---|---|---|---|---|---|
| | | % > 2.1 dE(76) | % > 1 dE2000 | AVG dE(76) | MAX dE(76) | AVG dE2000 | MAX dE2000 |
| 100^3 (genRGB) | 1000000 | 1.444 | 1.896 | 0.4189 | 8.697 | 0.2341 | 4.5 |
| 33^3 US (genRGB) | 35937 | 14.67 | 18.574 | 1.153 | 13.879 | 0.6402 | 4.953 |
| 33^3 ONP (genRGB) | 35937 | 8.576 | 11.103 | 1.006 | 14.629 | 0.53 | 4.982 |
| 33^3 DO (genRGB) | 35937 | 9.321 | 10.4 | 1.0006 | 16.759 | 0.5311 | 5.0253 |
| 100^3 (OptRGB) | 1000000 | 1.061 | 1.512 | 0.3535 | 7.444 | 0.201 | 4.748 |
| 33^3 US (OptRGB) | 35937 | 8.4405 | 13.135 | 0.9276 | 15.631 | 0.5212 | 5.002 |
| 33^3 ONP (OptRGB) | 35937 | 5.529 | 6.883 | 0.8223 | 12.177 | 0.4363 | 4.873 |
| 33^3 DO (OptRGB) | 35937 | 5.416 | 6.364 | 0.7924 | 12.92 | 0.4291 | 4.901 |

FIG. 7

REDUCING THE SIZE OF A HIGH RESOLUTION PROFILE LOOKUP TABLE

TECHNICAL FIELD

The present invention is directed to systems and methods for reducing the size of a high resolution profile look-up table (LUT) by down-sampling the high density cube to a low density cube.

BACKGROUND

Many print devices are configured to receive four-dimensional CMYK (cyan, magenta, yellow, and black) signals as input and, therefore, print CMYK colors which are determined from corresponding RGB values. A lookup table is commonly used to convert each digital RGB color signal value to a corresponding digital CMYK value before being received by the printer. Because printers inherently have a complex, nonlinear behavior and therefore have a complex nonlinear colorimetric response even after a printer is calibrated, the full spectrum of CMYK values and printed colors is not a completely accurate representation of the original RGB spectrum. Discrepancies may arise because the relationship between digital values that drive the print device and the resulting colorimetric response is a complex nonlinear function. To deal with this problem, a color correction table is constructed which approximates the mapping between RGB colorimetric space and CMYK values and corrects for non-linearities and unwarranted absorptions of inks or dyes such that the printer prints the true corresponding color. A color correction table can be as small as 16×16×16 (4096) locations with each location storing a four-dimensional CMYK value. Due to the above-described nonlinear response of the printer, there are areas of the color correction with high curvature that are under-sampled in the table and other smooth areas of the correction that are unnecessarily over sampled. Currently, small color correction tables result in loss of detail and higher delta E ($\Delta E$) accuracy in the darker areas. The term $\Delta E$ refers to a measure of color difference, e.g., a difference between a sample color and a reference color in L*a*b* color space. If the amount of image quality loss is too large, higher density correction tables can be employed to reduce the image quality loss.

Presently, to effectively capture the high curvature of the LUT, non-uniformly spaced input RGB levels are selected using an Optimal Node Placement technique. Optimal node placement is performed along each R, G and B channel independently. Node locations are parameterized and the parameters are solved for by reducing the sum of squares error between the high resolution profile LUT and the up-sampled lower resolution LUT. However, parametric optimal node placement forces node placement along a parametric curve and hence, node selection is only sub-optimal. Further, if the nodes on the grid are selected in such a way that they are off-neutral axis, interpolation error can be added for colors along the neutral axis. In final image quality of nonlinear printers, performance of a higher resolution profile LUT (e.g., 70-cube or 100-cube) is often better when compared to a lower resolution profile LUT (e.g., 24-cube or 33-cube), especially in shadows, highlights, flesh tones, sweeps, smoothness, contours, proof matching, neutrality/color balance, memory colors, chromatic colors, contrast, etc., across CMYK and RGB images. Low resolution LUTs are faster in custom profiling by iterating on the printer model in the field. The locations of the nodes in the table become more critical as the table becomes smaller.

Accordingly, what is needed in this art are increasingly sophisticated systems and methods which can capture the curvature of the LUT over the entire multi-dimensional space spanned by the LUT including boundaries and areas inside the LUT to address poor representation of local non-linearities of a printer in order to improve print quality of color reproduction.

Incorporated References

The following U.S. patents, U.S. patent applications, and Publications are incorporated herein in their entirety by reference.

"Optimal Node Placement For Multi-Dimensional Profile LUTS For Arbitrary Media And Halftones Using Parameterized Minimization", U.S. Patent Publication No. 20090161183

"Iteratively Clustered Interpolation For Geometrical Interpolation Of An Irregularly Spaced Multidimensional Color Space", U.S. Pat. No. 6,636,628 to Wang et al.

"*Refinement of Printer Transformations Using Weighted Regression*", Raja Bala, Proc. SPIE, Vol. 2658, pp. 334-340, (1996).

"*Dynamic Optimization Algorithm for Generating Inverse Printer Map with Reduced Measurements*", Sohail Dianat, Lalit K. Mestha, Athimoottil Mathew, Proceedings of IEEE ICASSP (May 2006).

"*A Two Dimensional Interpolation Function for Irregularly Spaced Data*", Donald Shepard, ACM National Conference Proceedings, Page 517-524, (1968).

"*International Color Consortium—Profile Specification Version 4.2*", (ICC-2004) Profile Format, and Structure.

"*A Practical Algorithm For The Inversion Of An Experimental Input-Output Color Map For Color Corrections*", Viassolo, Daniel; Dianat, Sohail; Mestha, L. K; Wang, Yao, International Society for Optical Engineering (SPIE), (March 2003).

BRIEF SUMMARY

What is disclosed is a novel system and method for capturing the curvature of a LUT over the entire multi-dimensional space spanned by the LUT, including boundaries and areas inside the LUT, to improve the quality of color reproduction. In a manner more fully described herein, a reduced LUT is produced which captures the curvature of the high-resolution LUT over the entire multi-dimensional space spanned by the LUT, including boundaries and areas inside the LUT. The size of the high resolution LUT is effectively reduced while retaining the benefits of a high density profile LUT. Color reproduction quality is improved because the curvature in all areas of the high density LUT is captured as a result of this process. The nodes in the low density LUT can be used to generate new profile LUTs and time required to re-profile in the field is at least the same or faster. Another advantage of the present method is that any region or axis of the printer gamut can be chosen to capture the non-linearities better while choosing the nodes from the high density cube. Any arbitrary color axis/region can be chosen to optimally select the nodes. These arbitrary axes or regions might be the axes or regions in the profile LUT where the non-linearities of the printer are critical for good color reproduction quality The present method is well suited to iterate on a printer instead of printer model while building the profile LUT due to greatly reduced number of nodes since it can further reduce the errors induced by printer model into the profile LUT.

In one example embodiment, the present method for reducing a size of a destination profile LUT to improve quality of color reproduction in an output color device, involves the following. First, a high resolution LUT comprising a high density cube, e.g., a 100-cube LUT, on a structured grid is received. Typically, the high density LUT is built in the factory using the updated printer model at that time. Nodes of the high density cube may be compressed to increase the total number of in-gamut colors. Next, at least one region of high curvature of a color gamut of an image output device is identified or the entire color gamut of the image output device can be considered to be the region of high curvature. Once the regions of high curvature have been identified, the following steps are iteratively performed until the error calculated for a given subset of nodes is below a predetermined threshold or reaches a minimum. 1) A subset of nodes are selected from the high density cube, the selecting effectuating a down-sampling of the high resolution LUT. The down-sampling produces a low resolution LUT comprising a low density cube on a structured grid. The low density LUT may be, for example, a 33-cube or a 24-cube LUT. 2) The low resolution LUT is then up-sampled to a desired number of nodes (same as the number of nodes of the high resolution LUT). The up-sampling produces an up-sampled low resolution LUT. If only a small region of the color gamut is selected, the corresponding output color values are determined using the low resolution LUT and the high resolution LUT. If the input color values already exist as the nodes of the LUT grid (as in the case of high resolution LUT), the output values are picked directly from the LUT. If the input color values do not exist on the LUT grid (as in the case of low resolution LUT), the corresponding output values are obtained using interpolation technique. 3) An error is calculated between color values of the up-sampled low resolution LUT and color values of the high resolution LUT if entire color gamut is used or an error is calculated between the color values obtained from the low resolution LUT and the color values obtained from the high resolution LUT if only a small color region or color axis is selected. Embodiments for an error function are discussed in detail herein further. 4) Selecting, for a next iteration, a next subset of nodes from the high density cube. The next subset of nodes are selected such that at least a portion of the next subset of nodes is different than the subset of nodes selected on any previous iteration. Once the error is calculated for all the subsets of nodes selected from the high density cube, the subset of nodes with the minimum error is chosen and a destination profile LUT can be generated from the selected subset of nodes having the minimum error. This would constitute an exhaustive search for the best subset of nodes among all the nodes of the high resolution LUT which would capture all the non-linearities of the printer in the region of high curvature (which can be the entire color gamut as explained earlier). In one embodiment, selection of the subset of nodes utilizes a dynamic optimization technique to speed up the exhaustive search and captures non-linearities in color quality performance of the image output device. The destination profile LUT can thereafter be used to profile the image output device. Various embodiments have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 5 shows a table of round trip errors for an iGen4 printer using the present method;

FIG. 7 shows a table of round trip errors for an FOGRA printer using the present method;

DETAILED DESCRIPTION

Figure 1:
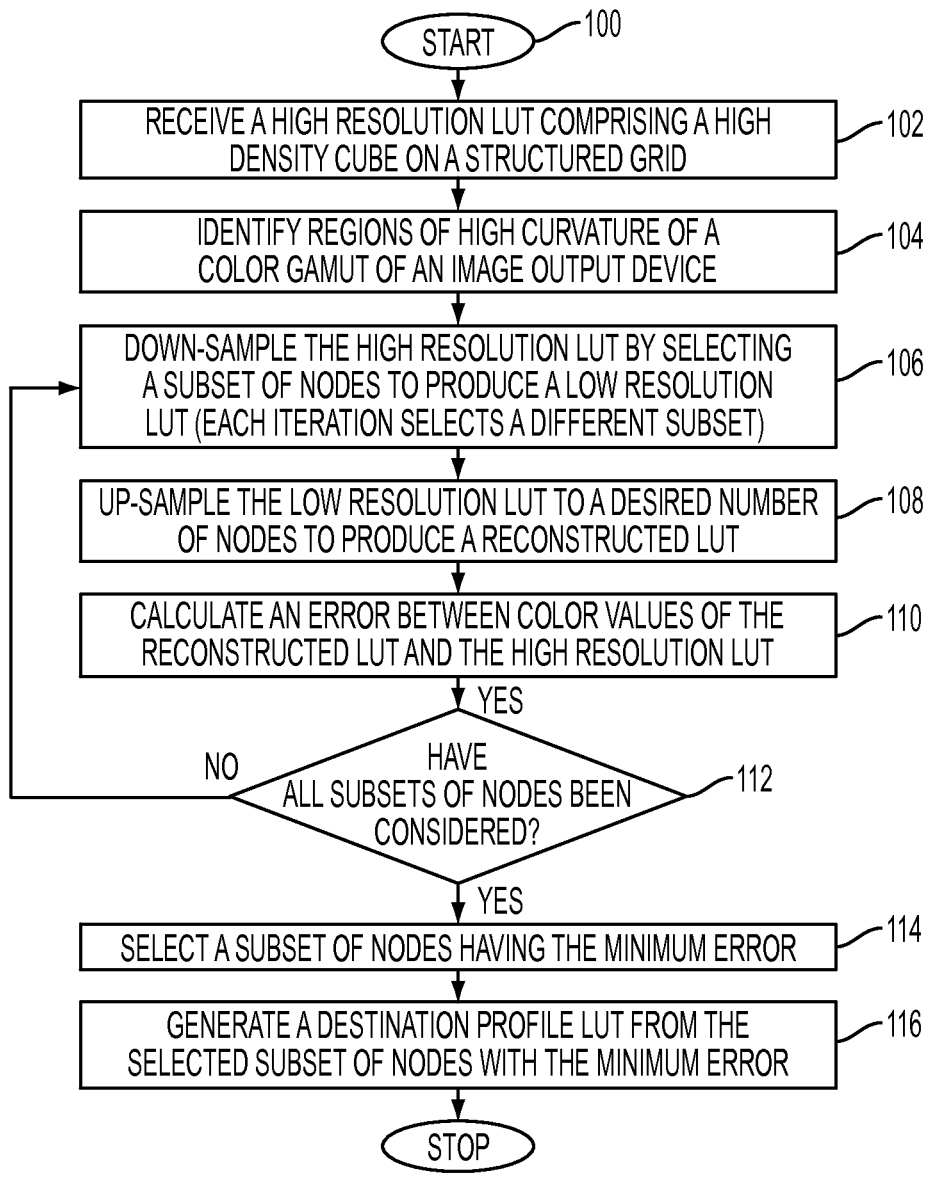
FIG. 1 is a flow diagram of one example embodiment of the present method for reducing the size of a high resolution profile LUT using optimal node down-sampling via dynamic optimization.

What is disclosed is system and method for capturing the curvature of a LUT over the entire multi-dimensional space spanned by the LUT, including boundaries and areas inside the LUT, or any selected high curvature subspace or axis of the LUT to improve the quality of color reproduction. In a manner more fully described herein, a reduced LUT is produced which captures the curvature of the high-resolution LUT over the entire multi-dimensional space spanned by the LUT, including boundaries and areas inside the LUT, or any selected high curvature subspace or axis of the LUT. The size of the high resolution LUT is effectively reduced while retaining the benefits of a high density profile LUT. Color reproduction quality remains same as that of the high resolution LUT because the curvature in all areas of the high density LUT is captured as a result of this process.

It should be understood that one of ordinary skill in this art would be readily familiar with many facets of color science and image processing and other techniques and algorithms commonly found in the color science and document reproduction arts. Those of ordinary skill would be familiar with the text: "*Digital Color Imaging Handbook*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

A "LUT", as used herein, refers to a multi-dimensional color correction lookup table used to profile a color marking device. Such a profile LUT generally comprises a series of nodes in an input color space (L*a*b* or XYZ) and, stored at each node, are device-specific (CMYK) output values. When the input pixels to be corrected correspond to the nodes of the LUT, the corresponding device-specific color values are retrieved directly from the LUT. If the pixels are not on the node then these are derived via interpolation. Standardized interpolation techniques map a device-specific (CMYK) representation to a visual (L*a*b*) color representation. Nodes in RGB space can be converted to the device-independent color space (L*a*b* or XYZ) using a suitable transformation (e.g. ProPhoto RGB or genRGB). The resulting L*a*b* (or XYZ) values are passed to a destination profile LUT. A destination profile is a look-up table between the input RGB nodes and the output corrected CMYK nodes. These mathematical transformations are often embodied as multi-dimensional LUTs which provide the capability to match the printed color to a proofing device. Destination profile LUTs (RGB to CMYK) are affected by (i) choice of color space (nodes and node spacing), (i) gamut mapping, (iii) GCR/UCR strategy, and (iv) printer model accuracy. One complete procedure of building a profile LUT can be found in Chapter 7 of the above-referenced text: "*Control of Color Imaging Systems Analysis and Design*".

A "high resolution LUT" refers to a multi-dimension LUT comprising at least a size 70-cube. The high resolution LUT is referred to herein by the notation $T_{high}$.

A "low resolution LUT" refers to a multi-dimensional LUT, e.g. ≦33-cube, and is built by selecting a subset of nodes from the high resolution LUT. The low resolution LUT is referred to herein by the notation $T_{low}$.

"Up-sampling" is a process of interpolation which takes a low resolution LUT as input and generates a high resolution LUT as output.

"Down-sampling" is a node selection technique which takes a high resolution LUT as input and generates a low resolution LUT as output. Down sampling can be effectuated using a dynamic optimization technique to speed up the node selection technique.

"Dynamic optimization" is an algorithm which selects a finite number of colors (or points in L*a*b* color space) by minimizing the mean squared error (MSE $\Delta E^*_{ab}$) between the actual printer output and the up-sampled printer output constructed using a finite number of points as defined by:

$$\Delta E^*_{ab} = \|L^*a^*b^*(\text{out1}) - L^*a^*b^*(\text{out2})\| \quad (1)$$

$$Lab(\text{out1}) = P(CMY) \quad (2)$$

$$Lab(\text{out2}) = \hat{P}(CMY) \quad (2)$$

The LUT ($\hat{P}$) is obtained by up-sampling the smaller LUT containing the finite number of critical colors. $\hat{P}$ is the high resolution LUT. CMY can be every node in the high resolution LUT or can be node in a selected high curvature region or axis of the high resolution LUT. Dynamic optimization uses a multistage decision process and a definable performance criteria such as minimization of the $\Delta E^*_{ab}$ error. A 1-D dynamic optimization technique can be extended to 2 or 3 dimensions. The 3-D approach is preferable to find critical colors for measurement of a three-to-three printer forward map, for example. Dynamic optimization is often used in linear systems with time-varying feedback gains and can be viewed, generally, as an exhaustive search technique which divides the search into a plurality of overlapping search problems. Each of a 1-D, 2-D and 3-D dynamic optimization technique is described in chapter 6.5.3 of the above-referenced text: *Control of Color Imaging Systems: Analysis and Design* by Mestha. Dynamic Optimization is also described in the above-referenced paper: *Dynamic Optimization Algorithm for Generating Inverse Printer Map with Reduced Measurements*.

An "image output device" is any device capable of rendering an image of a document. The set of image output devices includes digital document reproduction equipment and other xerographic systems, photographic production and reproduction equipment, including a wide variety of color marking devices as are generally known in the color document reproduction arts.

Reference is now being made to the flow diagram of FIG. 1 which illustrates one example embodiment of the present method for reducing the size of a high resolution profile LUT. Flow processing begins at step 100 and immediately proceeds to step 102.

At step 102, a high resolution profile LUT $T_{high}$ is received. The high resolution profile LUT comprises a high density cube on a structured grid of at least 70-cube. Methods for creating a high resolution profile are well established. Typically, the high density LUT (100-cube) is built in the factory using the initial printer model by, for example, placing 100 uniformly spaced nodes along each of the R, G and B axes in either genRGB space or any other optimized RGB space in such a way that R=G=B. Nodes of the high density cube may have been compressed to increase a total number of in-gamut colors. In various embodiments, the high resolution profile LUT is received over a network, or retrieved from a database in communication with the example computer workstation of FIG. 2.

At step 104, at least one region of high curvature of a color gamut of an image output device is identified. Regions of a color gamut exhibiting high curvature tend to be near the gamut surface and around the edges and corners of the gamut. Such regions can be identified by a user input using, for example, user interface 226 of a computer workstation 218 of FIG. 2. Regions of high curvature of a desired color space for which the present teachings hereof are employed can have been previously identified or received as a result of an output of a mathematical process which identifies regions of high curvature using geometrical and/or topological techniques used in the arts.

Figure 4:
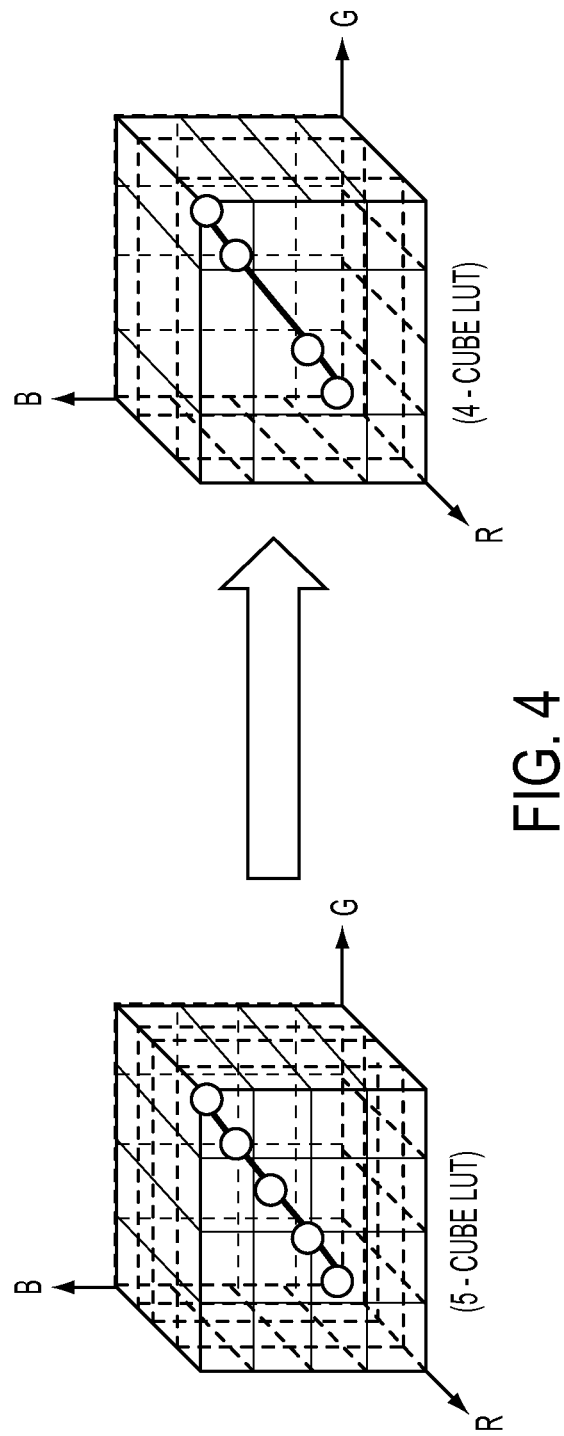
FIG. 4 shows a 5-cube LUT in RGB space down-sampled to a 4-cube LUT with down-sampling having occurred along the neutral axis.

At step 106, a subset of nodes is selected from the high density cube. The selection process effectuates a down-sampling of the high resolution LUT to produce a low resolution LUT $T_{low}$ comprising a low density cube on a structured grid. A number of desired nodes (e.g. 33) are selected along each axis from the 100 nodes (again with a constraint R=G=B). This number depends on the size of the final profile LUT that is used in the printer during custom profiling in the field. FIG. 4 shows an example 5-cube LUT in RGB space down-sampled to a 4-cube LUT with node sampling occurring along the neutral axis since R=G=B. A non-parametric node selection technique called Dynamic Optimization is utilized herein for down-sampling the number of nodes from the high density profile LUT (e.g., 70-cube or 100-cube) to produce a low resolution profile LUT (e.g., a 24-cube or 33-cube). Alternatively, a direct exhaustive search technique is utilized.

At step 108, the low resolution LUT is up-sampled to a desired number of nodes. The low resolution LUT is preferably up-sampled to a same size as the high resolution LUT here since in this example embodiment the entire gamut is being considered as a region of high curvature. Up-sampling comprises any of a variety of interpolation methods and need not be the same as the interpolation method used in the final product. There are many interpolation techniques such as, for example, moving matrix, trilinear, tetrahedral, and routines described in MATLAB software. A sequential linear interpolation (SLI) technique requires an accurate, sequentially structured grid. Up-sampling of the low resolution profile LUT produces an up-sampled reconstructed LUT, $T_{reconstruct}$.

It is desirable that the interpolation scheme used to generate the reconstructed high resolution LUT be identical to the interpolation scheme used with the low resolution LUT installed in the end product.

At step 110, an error is calculated between color values along the piecewise linear line and color values along a line interpolated between corresponding nodes of the high resolution LUT. A generalized error function can be given as:

$$Err = \sum_{k=1}^{m} \sum_{i=1}^{n} (T_{high}(i,k) - T_{reconstruct}(i,k))^2 \quad (4)$$

where k=1 to m (m is the total number of colors), i=1 to n (n is the total number of nodes), and where $T_{high}(i,k)$ and $T_{reconstruct}(i,k)$ represent the color values of the $k^{th}$ color of the $i^{th}$ node of the high resolution LUT and the reconstructed LUT, respectively. In essence, a Euclidean distance is determined between the color values at each color of each node.

At step 112, a determination is made whether all the subsets of nodes, formed by different combinations of nodes from the high resolution LUT, were considered to generate the low resolution LUT. If not then processing repeats with respect to step 106 wherein a next subset of nodes is selected from the high density cube such that at least a portion of the next subset of nodes is different than the subset of nodes selected on any previous iteration. An error value is determined for that subset of nodes. The process repeats until all the subsets in step 106 have been used to generate the low resolution LUT.

At step 114, the subset of nodes with minimum error in step 110 are selected.

At step 116, a destination profile LUT is generated for the image output device from the selected subset of nodes with the minimum error. Thereafter, processing stops.

The destination profile LUT can then be used to profile the image output device. The reduced LUT captures the curvature of the high-resolution LUT over the entire multi-dimensional space spanned by the LUT, including boundaries and areas inside the LUT. The size of the high resolution LUT is effectively reduced while retaining the benefits of a high density profile LUT. Color reproduction quality is improved because the curvature in all areas of the high density LUT is captured as a result of this process. In the field, the nodes in the low density LUT can be used to generate new profile LUTs and time required to re-profile in the field is at least the same or faster. Another advantage of the present method is that any region or axis of the printer gamut can be chosen to capture the non-linearities better while choosing the nodes from the high density cube. In this case, the error calculated in step 110 will consist of the nodes derived only from the pre-selected region or axis of the high resolution LUT with high curvature. The present method is well suited to directly iterate on the printer instead of printer model while building the profile LUT due to greatly reduced number of nodes since it can further reduce the errors induced by printer model into the profile LUT.

Figure 2:
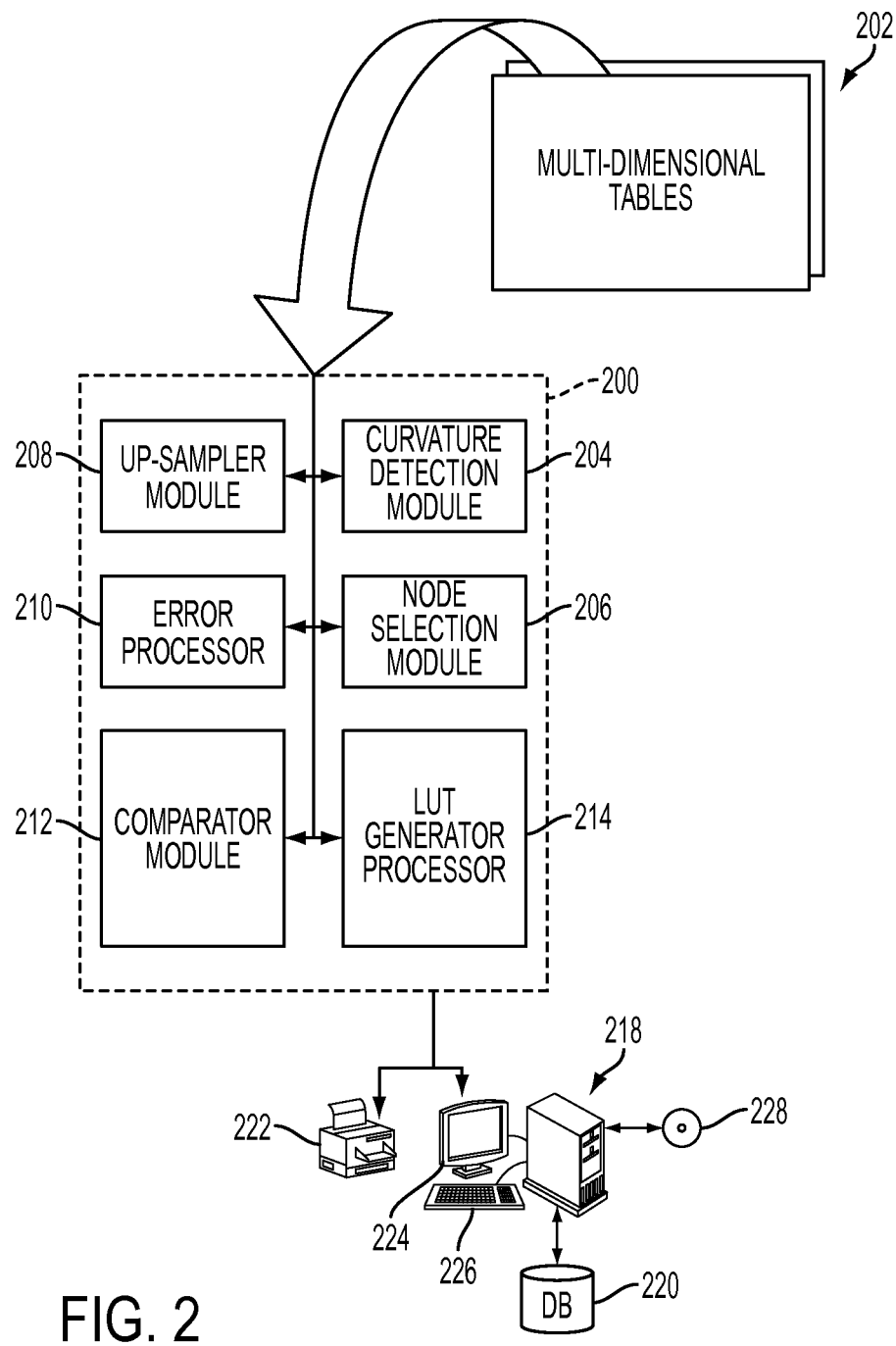
FIG. 2 illustrates one example image processing system for implementing various aspects of the present method according to the flow diagram of FIG. 1.

Reference is now being made to FIG. 2 which illustrates one example image processing system 200 for implementing various aspects of the present method according to the flow diagram of FIG. 1.

In FIG. 2, a high resolution profile LUT 202 is received. Although the high resolution profile LUT comprises a high density cube on a structured grid, it is illustrated as a plurality of multi-dimensional tables. Alternatively, the high resolution profile LUT is retrieved from database 220 of computer workstation 218. High curvature detection module 202 identifies at least one region of high curvature of a color gamut of an image output device. Such regions can be identified by a user input using, for example, the user interface 226 of a computer workstation 218. The gamut for the image output device for which the regions of high curvature have been identified may reside in memory or on a storage device associated with computer 218. Regions of a color gamut exhibiting high curvature may reside in one or more records stored in database 220. Node selection module 206 selects a subset of nodes from the high density cube. The selection process effectuates a down-sampling of the high resolution LUT to produce a low resolution LUT comprising a low density cube on a structured grid. A number of desired nodes selected depends on the size of the final profile LUT that is used in the printer during custom profiling in the field. Node selection module 206 implements a dynamic optimization algorithm. Up-sampler module 208 implements an interpolation technique to up-sample the low resolution LUT to a desired number of nodes. This produces the reconstructed LUT. Error processor 210 determines the amount of error between color values of the up-sampled reconstructed LUT and color values of the high resolution LUT using any of the error formula provided herein. Interim values and data points used for the error calculation may be communicated to the workstation 218 and displayed on display device 224 for review. Comparator module 212 determines whether the error has reached a minimum or is otherwise below a pre-determined threshold. If not then processing repeats wherein a next subset of nodes is selected from the high density cube such that at least a portion of the next subset of nodes is different than the subset of nodes selected on any previous iteration. An error value is determined for that subset of nodes. The process repeats in an iterative manner until the error calculated in step 110 is at a minimum or is below a pre-determined threshold. LUT generator processor 214 generates a destination profile LUT for an image output device from the selected subset of nodes having the minimum error.

The image processing system 200 is capable of executing various aspects of the present method and performing other functionality. The image processing system is shown in communication with computer system 218. Some of the processing of any of the modules of the image processing system may be performed by workstation 218 and values and variables used in such processing may be stored in database 220 or provided to image output device 222 or displayed on display device 224. In various embodiments, the user enters information using keyboard 226. The destination profile LUT generated in accordance with the teachings hereof may be further off-loaded to a storage medium 228 for storage or transport. Any of the modules shown therein may reside in computer system of FIG. 2 as hardware and/or software. Image processing system 200 may further carry out processing on the basis of commands received from computer 218 or which have been received over a communication network (not shown). Various specialized image processing applications may additionally be performed to facilitate or effectuate any of the processing performed by the image processing system 200. The image processing system may be provided as a general structure having an external memory, or as a special purpose computer as discussed herein further.

It should be appreciated that various modules of the schematic block diagram of FIG. 2 designate a system component which may comprise software and/or hardware designed to perform a specific function. A plurality of modules may collectively perform a function. A module may have specialized processor capable of reading machine executable program instructions. A module may comprise a single piece of hardware such as an ASIC, electronic circuit, or special purpose computer. A plurality of modules may be executed by either a single special purpose computer system or a plurality of special purpose computer systems in parallel. Connections between modules includes both physical and logical connections. Modules may further include one or more software/hardware modules which may further comprise an operating system, drivers, device controllers, and other apparatuses some or all of which may be connected via a network. System 200 may be connected to a server via a network such as a LAN, a WAN, or the like. Any of the modules of the image processing system or workstation 218 may be placed in communication with one or more other devices in a networked environment.

Figure 3:
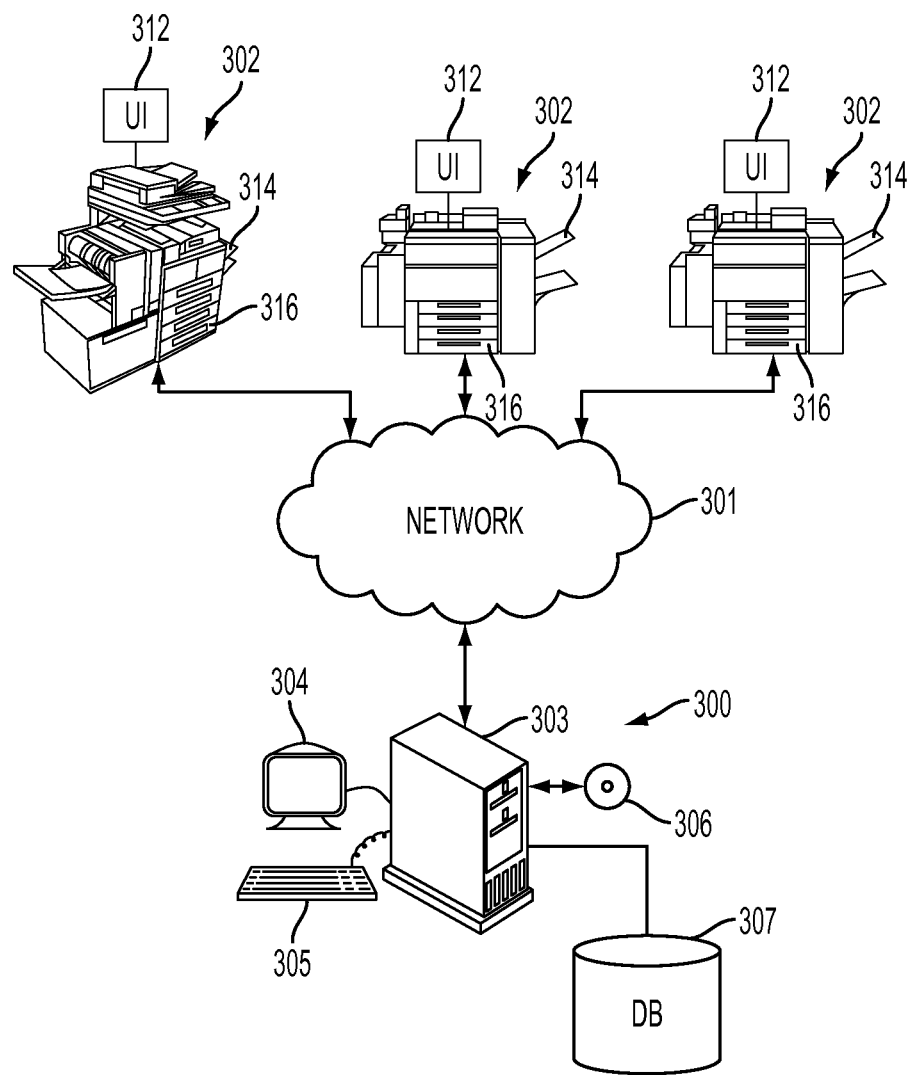
FIG. 3 illustrates one example networked document reproduction environment wherein one or more aspects of the present method may be utilized.

Reference is now being made to FIG. 3 which illustrates one embodiment of a networked document reproduction system environment wherein one or more aspects of the present method are likely to find their intended uses.

The example networked document reproduction environment is shown generally comprising a computer system 300 connected to various multi-function devices 302 over network 301. Such a networked environment may be wholly incorporated within the confines of a single print/copy center or may be distributed to many different locations throughout an enterprise network. Computer platform 300 is placed in digital communication with a plurality of multi-function devices 302 over a network illustrated as amorphous cloud 301. Many aspects of network 301 are commonly known and may include the World Wide Web. A further discussion as to the construction and/or operation of a specific network configuration or the Internet has been omitted. Suffice it to say, data is transmitted in packets between networked devices via a plurality of communication devices and links using established protocols. Data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway.

Computer platform 300 is shown comprising a computer case 303 housing therein a motherboard, CPU, memory, interface, storage device, and a communications link such as a network card. The computer system also includes a display 304 such as a CRT or LCD. An alphanumeric keyboard 305 and a mouse (not shown) provide a mechanism for the computer system to accept a user input. Computer program product 306 contains machine executable instructions and other machine readable instructions for implementing the functionality and features of the present method. Such a computer platform includes database 307 for storage and retrieval of historical data. The computer platform is capable of running a server software program (or housing server hardware) for hosting installed applications. Server software capable of hosting service applications are readily available from a variety of vendors. The computer platform may be further capable of creating and running service proxies for directing requests for applications from a client device to the platform hosting the requested application and for redirecting responses from a host device to a requesting client device. The computer platform 300 may act as a server to the processors (not shown) resident aboard a controller module residing within one or more of the multi-function devices 302. The computer platform may alternatively be any of a desktop, laptop, server, mainframe, or the like, common in the arts.

Networked computer platform 300 is capable of receiving data from any of the networked multi-function devices 302 in response to the present method and providing one or more device-specific control instructions to the networked device in response to the present method having determined the mean errors in any of the process and lateral directions for any of a first or second side of the received digital image, in accordance with the present method. Special purpose program instructions loaded thereon cause a central processor of the computer to make any of the determinations or calculations, discussed with respect to the flow diagrams hereof, and provide the user with selectable menu options regarding error magnitude and direction and make recommendations for adjustments to be made to the networked multi-function device based, in part, on data stored in the historical database 307.

In the embodiment shown, computer system 300 implements database 307 wherein various records are stored, manipulated, and retrieved in response to a query. Although the database is shown as an external device, the database may be internal to computer case 303 mounted on the hard disk therein. Regions of a color gamut exhibiting high curvature may reside in one or more records stored in database. Records stored in the database can be retrieved, modified, and updated by computer platform or, additionally, by any of the multi-function devices 302 which have been placed in communication with the database. A record refers to any data structure capable of containing information which can be indexed, stored, searched, and retrieved in response to a query. Such constructs are well established in the software and database arts. The database of FIGS. 2 and 3 are known in the arts and are each capable of indexing a plurality of records, receiving and interpreting a query, and retrieving one or more records in response to the query. The database is also capable of adding new records and updating existing records. Since database construction, optimization, indexing, and record retrieval techniques are well known, a further discussion as to a specific database implementation is omitted. One of ordinary skill would be able to readily acquire and implement a database to store, index, and retrieve records in response to a query.

Multi-function devices 302 are shown including a user interface (UI) 312 for the display thereon of icons and other selectable menu options and displayed information in response to an operation of the present method. The graphical UI includes a touch screen display for receiving user input via a touch-sensitive surface, and may further include any of a keyboard, keypad, mouse, touchpad, and the like. A display on the multi-function device is one of many possible displays retained in a memory associated with a user interface, including device-specific settings for instructing a control unit to adjust the multi-function device to reduce the IOP registration in accordance herewith. The user interface includes controls for programming a range of values therefrom for carrying out various embodiments of the present method. The user interface further includes controls for programming the specific system settings to configure any of the networked multi-function devices to perform various aspects of the present method in accordance with the teachings hereof. In the illustrated embodiments, multi-function devices 302 are shown including a input tray 314 for document input, and output trays 316 for retaining a variety of print media. Such devices are capable of performing a print/scan/copy job function as is generally known in the digital document arts. One or more of the multi-function devices 302 further incorporates various features, capabilities, and functionality of scanner device for scanning a document into a digital image, in a manner which is well known in the arts.

Computer platform 300 and the plurality of multi-function devices 302 collectively form a subnet. Techniques for placing computers in network communication with multi-function devices are well established. Therefore, a further discussion as to techniques for placing such systems and devices in network communication has been omitted. Computer platform 300 and the multi-function devices 302 each includes a network interface card (not shown) which facilitates the transmission of data over network 301. Any of the networked devices may include an Ethernet or similar card to connect to network 301 using, for example, a modem. Typical network interface cards found in the arts also enable one or more of the functionality of, for example, general purpose systems such as POTS (Plain Old Telephone System) and Integrated Services Digital Network (ISDN) and/or special purpose systems such as a Local Area Network (LAN) and Wireless Area Network (WAN) functionality. One or more of the multi-function devices 302 may also be place in digital communication with one or more other devices depending on the desired configuration and the objectives to be achieved in a given document reproduction environment. Various print/copy/scan devices of the document reproduction environment of FIG. 3 may also include processors capable of executing program instructions incorporating one or more aspects and/or feature enhancements of the present method as described with respect to the flow diagram of FIG. 1 and the block diagram of FIG. 2. One or more of the multi-function devices 302 can be placed in digital communication with database 307 over network 301.

The results for iGen4 printer are presented herein for comparison purposes. A 100-cube uniformly spaced profile LUT was built initially using genRGB color space and Optimal RGB color space as the input color spaces. Then a 33-cube profile LUT was built from the 100-cube LUT using parametric optimal node placement and using Dynamic Optimization. In the tables of FIGS. 5 and 7, 'US' represents uniformly spaced nodes, 'ONP' represents node selection using the prior art technique of parametric optimal node placement and 'DO' represents the node selection via Dynamic Optimization.

FIG. 5 shows a table of round trip errors for an iGen4 printer using the present method.

Figure 6:
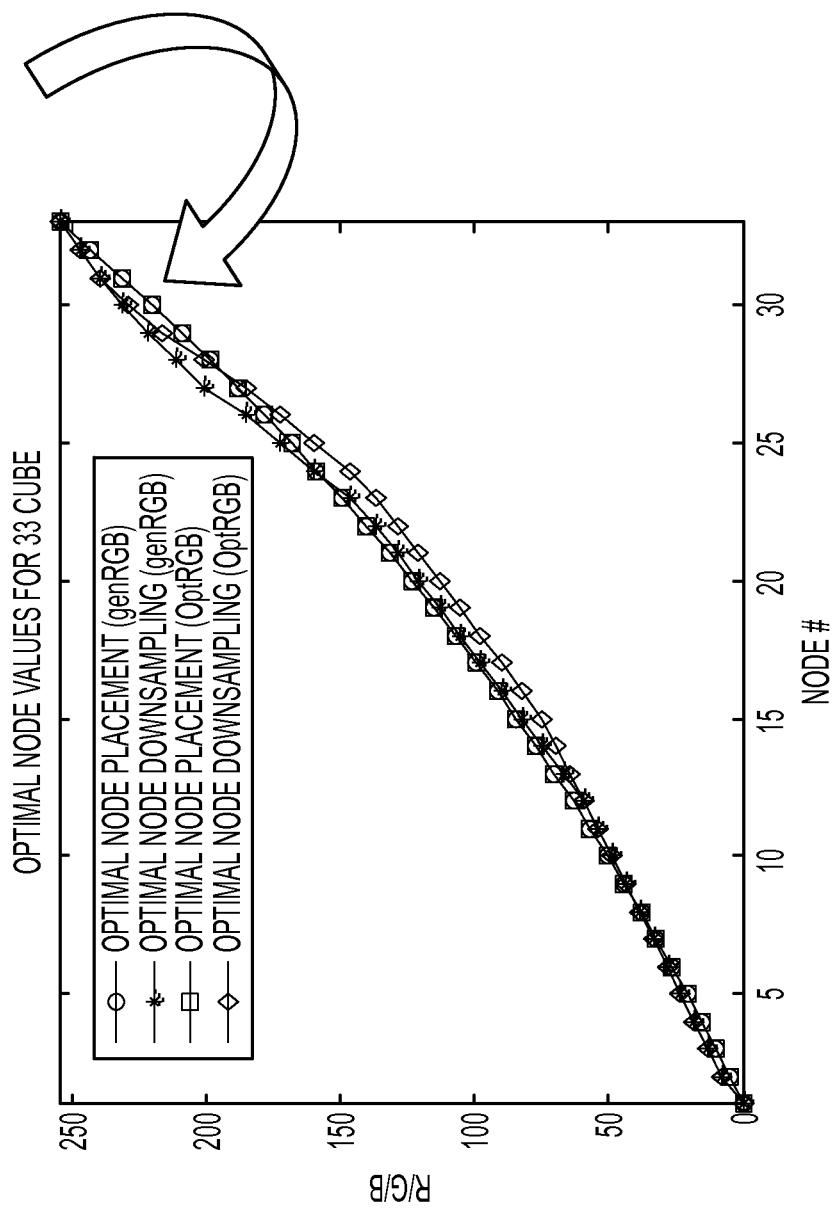
FIG. 6 illustrates a comparison between the present method and the prior art technique of parametric optimal node placement for an iGen4 printer.

FIG. 6 shows how the present method compares against the prior art parametric optimal node placement for the iGen4 printer.

FIG. 7 shows a table of round trip errors for a FOGRA printer using the present method.

Figure 8:
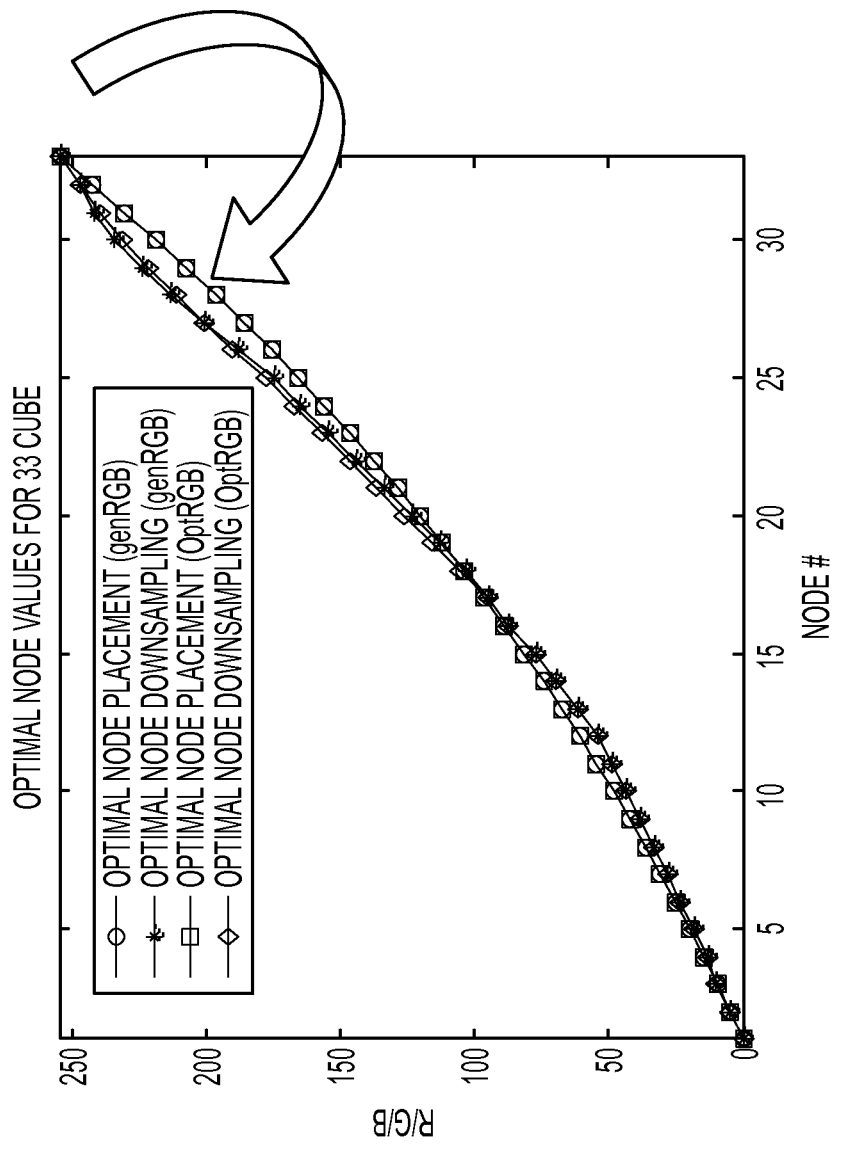
FIG. 8 illustrates a comparison between the present method and the prior art technique of parametric optimal node placement for a FOGRA printer.

FIG. 8 shows how the present method compares against the prior art parametric optimal node placement for a FOGRA printer. FIGS. 7 and 8 further illustrate that, in the region of the curve indicated by their respective arrows, Parametric Optimal Node Placement restricts the placement of nodes to be along a specific curve and hence misses some local non-linearities of the printer.

Figure 9A:
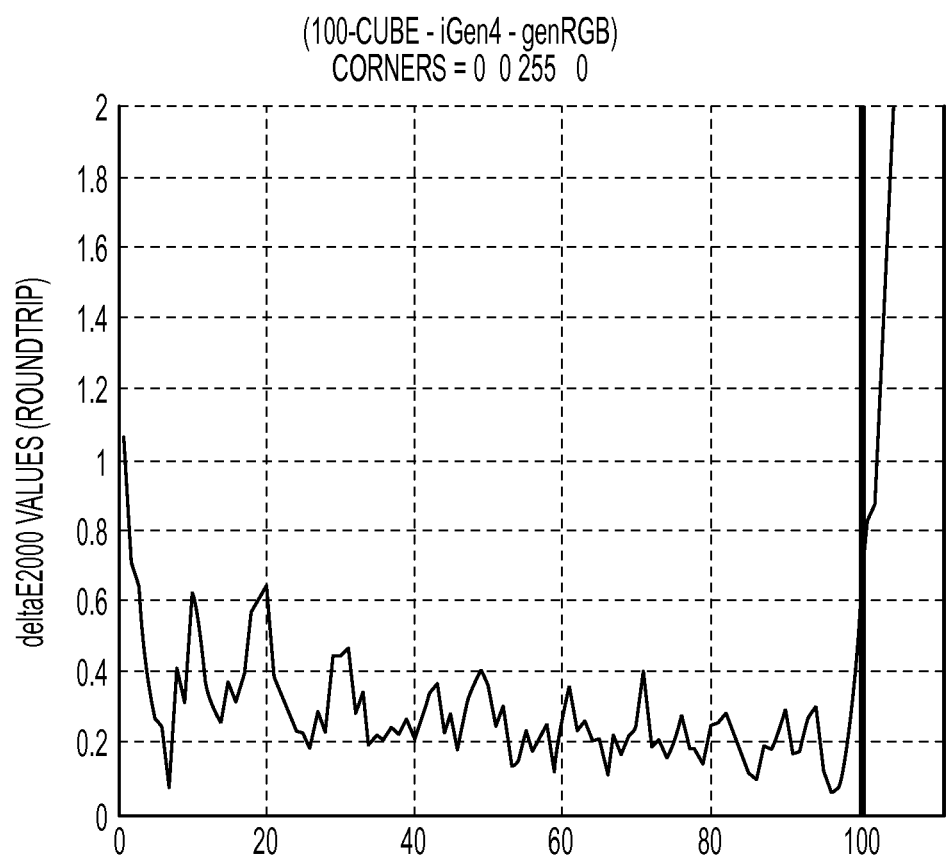
FIGS. 9A-C illustrate that node selection via parametric optimal node placement (33-cube) results in increased deltaE2K values near the corner compared to the high resolution 100-cube (FIG. 9A) while node selection via dynamic optimization reduces the deltaE2K near the corner to values similar to that of the 100-cube.
Figure 9B:
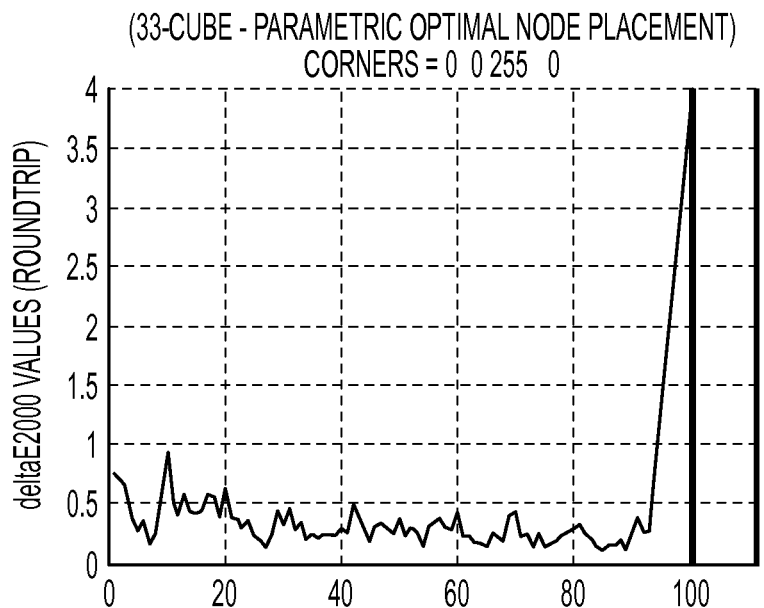
Figure 9C:
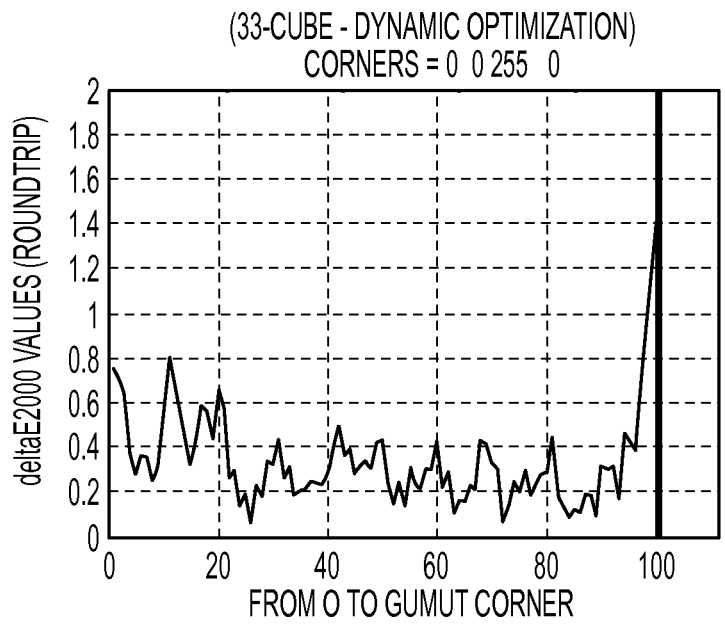

FIGS. 9A-C collectively illustrate that parametric node placement (33-cube) has increased deltaE2K values near the corner compared to 100-cube while Dynamic Optimization reduced the deltaE2K near the corner to values similar to that of 100-cube.

Figure 10:
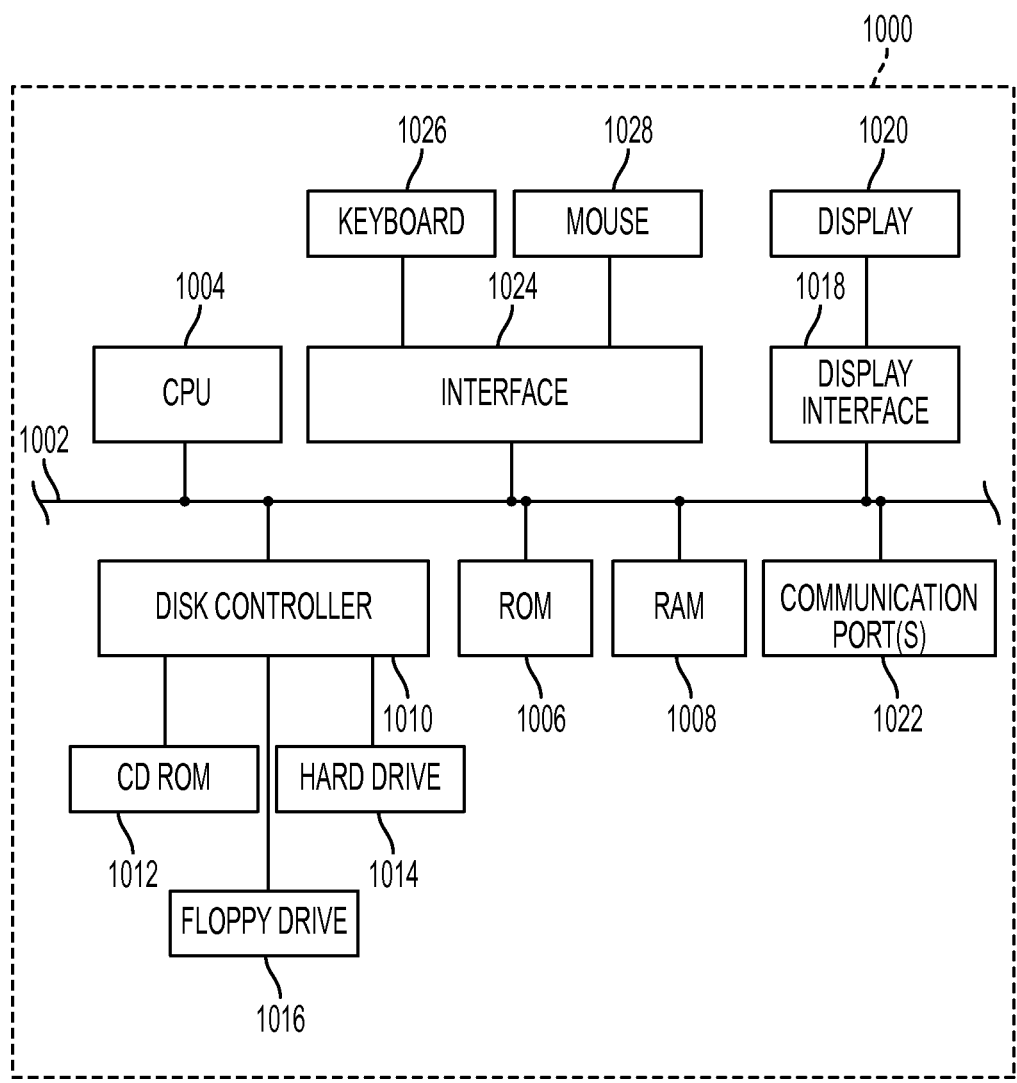
FIG. 10 illustrates a block diagram of one example embodiment of a special purpose computer system for performing one or more aspects of the present system and method as described with respect to the example flow diagram of FIG. 1.

Reference is now being made to FIG. 10 which illustrates a block diagram of one example embodiment of a special purpose computer system for performing one or more aspects of the present system and method as described with respect to the example flow diagram of FIG. 1.

Any of the features or functions of the above-described embodiments may comprise, in whole or in part, a special purpose computer which includes a processor capable of executing machine readable program instructions for carrying out one or more aspects of the present method. Such a special purpose computer may comprise, for example, a micro-processor, micro-controller, device driver, an electronic circuit, or an ASIC designed to perform some or all of the methods hereof. Such a special purpose computer can be integrated, in whole or in part, with for example, a xerographic system, a color management system, an image processing system, or a digital front end (DFE). All or portions of the diagrams of the present system and method, as illustrated herein, may be implemented partially or fully in hardware in conjunction with machine executable instructions in communication with various components of such a system. The exact nature of the implementation will depend on the document processing environment wherein the present method finds its intended uses. Such a system can be integrated, in whole or in part, with a xerographic system, color management system, image processing system, or any of a number of computing devices including those in a networked environment. All or portions of the flow diagram of FIG. 1 and the schematic block diagram of FIG. 2 may be implemented partially or fully in hardware in conjunction with machine executable instructions in communication with various components of such a system.

The special purpose computer incorporates a central processing unit (CPU) 1004 capable of executing machine readable program instructions for performing any of the calculations, comparisons, logical operations, and other program instructions for performing the methods described above with respect to the flow diagrams and block diagrams hereof. The CPU is in communication with Read Only Memory (ROM) 1006 and Random Access Memory (RAM) 1008 which, collectively, constitute example memory storage devices. Such memory may be used to store machine readable program instructions and other program data and results to sufficient to carry out any of the functionality described herein. Disk controller 1010 interfaces with one or more storage devices 1014. These storage devices may comprise external memory, zip drives, flash memory, USB drives, memory sticks, or other storage devices with removable media such as CD-ROM drive 1012 and floppy drive 1016. Machine executable program instructions execute the methods hereof or perform any of the functionality show with respect to the above-described embodiments. Computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein. Display interface 1018 effectuates the display of information on display device 1020 in various formats such as, for instance, audio, graphic, text, and the like. Interface 1024 effectuates a communication via keyboard 1026 and mouse 1028. Such a graphical user interface is useful for a user to review any of the identified objects and for entering information in accordance with various embodiments hereof. Communication with external devices may occur using example communication port(s) 1022. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for generating a destination profile LUT to improve quality of color reproduction, the method comprising:

receiving a high resolution LUT comprising a high density cube on a structured grid in a color space of an image output device;

selecting a size of a destination profile LUT comprising a high density cube on a structured grid in a color space of an image output device, said size defining a target number of nodes along a neutral axis of said destination profile LUT, said target number of nodes being less than a number of nodes on the neutral axis of said high density cube;

repeating until all the subsets of nodes are considered:

selecting a subset of nodes along a neutral axis of said high density cube, a number of nodes in said subset being equal to said target number of nodes inclusive of nodes at a start and endpoint of said neutral axis, said selecting effectuating a down-sampling of said high resolution LUT and producing a low resolution LUT;

up-sampling said low resolution LUT to a desired number of nodes, said up-sampling producing an up-sampled reconstructed LUT;

interpolating between each of said selected subset of nodes;

calculating an error between color values between high resolution LUT and low resolution LUT; and selecting a next subset of nodes for a next iteration, at least a portion of nodes selected on a next iteration being different than nodes selected on any previous iteration;

selecting the subset of nodes with minimum error; and generating a destination profile LUT for said image output device from said selected subset of nodes.

2. The method of claim 1, wherein said high resolution LUT comprises a size of at least 70-cube.

3. The method of claim 1, wherein said low resolution LUT comprises a size no greater than 33-cube.

4. The method of claim 1, wherein said subset of nodes are selected using dynamic optimization which captures non-linearities in color quality performance of said image output device.

5. The method of claim 1, wherein said error comprises:

$$Err = \sum_{k=1}^{m}\sum_{i=1}^{n}(T_{high}(i,k) - T_{reconstruct}(i,k))^2$$

where m is the number of colors, n is the number of nodes, $T_{high}(i,k)$ and $T_{reconstruct}(i,k)$ are the color values of the $k^{th}$ color of the $i^{th}$ node of the high resolution LUT and the reconstructed LUT, respectively.

6. The method of claim 1, wherein nodes of said high density cube have been compressed to increase a total number of in-gamut colors.

7. The method of claim 1, further comprising using said destination profile LUT to profile said image output device.

8. A system for generating a destination profile LUT to improve quality of color reproduction, the system comprising:
  a memory and a storage medium for storing data; and
  a processor in communication with said memory and said storage medium said processor executing machine readable program instructions to perform a method comprising:
    receiving a high resolution LUT comprising a high density cube on a structured grid in a color space of an image output device;
    selecting a size of a destination profile LUT comprising a high density cube on a structured grid in a color space of an image output device, said size defining a target number of nodes along a neutral axis of said destination profile LUT, said target number of nodes being less than a number of nodes on the neutral axis of said high density cube;
    repeating until all the subsets of nodes are considered:
      selecting a subset of nodes along a neutral axis of said high density cube, a number of nodes in said subset being equal to said target number of nodes inclusive of nodes at a start and endpoint of said neutral axis, said selecting effectuating a down-sampling of said high resolution LUT and producing a low resolution LUT;
      up-sampling said low resolution LUT to a desired number of nodes, said up-sampling producing an up-sampled reconstructed LUT;
      interpolating between each of said selected subset of nodes;
      calculating an error between color values between high resolution LUT and low resolution LUT; and
      selecting a next subset of nodes for a next iteration, at least a portion of nodes selected on a next iteration being different than nodes selected on any previous iteration;
    selecting the subset of nodes with minimum error; and
    generating a destination profile LUT for said image output device from said selected subset of nodes.

9. The system of claim 8, wherein said high resolution LUT comprises a size of at least 70-cube.

10. The system of claim 8, wherein said low resolution LUT comprises a size no greater than 33-cube.

11. The system of claim 8, wherein said subset of nodes are selected using dynamic optimization which captures non-linearities in color quality performance of said image output device.

12. The system of claim 8, wherein said error comprises:

$$Err = \sum_{k=1}^{m}\sum_{i=1}^{n}(T_{high}(i,k) - T_{reconstruct}(i,k))^2$$

where m is the number of colors, n is the number of nodes, $T_{high}(i,k)$ and $T_{reconstruct}(i,k)$ are the color values of the $k^{th}$ color of the $i^{th}$ node of the high resolution LUT and the reconstructed LUT, respectively.

13. The system of claim 8, wherein nodes of said high density cube have been compressed to increase a total number of in-gamut colors.

14. The system of claim 8, further comprising using said destination profile LUT to profile said image output device.

15. A computer implemented method for generating a destination profile LUT to improve quality of color reproduction, the method comprising:
  receiving a high resolution LUT $T_{high}$ comprising a high density cube on a structured grid of at least a 70-cube;
  identifying at least one region of high curvature of a color gamut of an image output device;
  repeating until all the subsets of nodes are considered:
    using a dynamic optimization technique to select a subset of nodes from said high density cube, said selecting effectuating a down-sampling of said high resolution LUT and producing a low resolution LUT $T_{low}$ not greater than 33-cube;
    up-sampling said low resolution LUT to a desired number of nodes, said up-sampling producing a reconstructed LUT, $T_{reconstruct}$;
    calculating an error between color values of said reconstructed LUT and color values of said high resolution LUT; and
    selecting, for a next iteration, a next subset of nodes from said high density cube, said next subset of nodes being selected such that at least a portion of said next subset of nodes is different than the subset of nodes selected on any previous iteration;
  selecting the subset of nodes with minimum error;
  generating a destination profile LUT for said image output device from said selected subset of nodes with the minimum error; and
  using said destination profile LUT to profile said image output device.

16. The method of claim 15, wherein said error comprises:

$$Err = \sum_{k=1}^{m}\sum_{i=1}^{n}(T_{high}(i,k) - T_{reconstruct}(i,k))^2,$$

where m is the number of colors, n is the number of nodes, $T_{high}(i,k)$ and $T_{reconstruct}(i,k)$ are the color values of the $k^{th}$ color of the $i^{th}$ node of the high resolution LUT and the reconstructed LUT, respectively.

17. The method of claim 15, wherein nodes of said high density cube have been compressed to increase a total number of in-gamut colors.

* * * * *